(12) United States Patent
Bich

(10) Patent No.: US 7,484,348 B2
(45) Date of Patent: Feb. 3, 2009

(54) CROP GATHERING CONVEYOR WITH OVERLAPPABLE GATHERING ELEMENTS FOR A HEADER OF AN AGRICULTURAL HARVESTING MACHINE

(75) Inventor: Gary L. Bich, New Holland, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/804,626

(22) Filed: May 18, 2007

(65) Prior Publication Data

US 2008/0282660 A1  Nov. 20, 2008

(51) Int. Cl.
*A01D 45/02* (2006.01)
(52) U.S. Cl. .......................................................... 56/93
(58) Field of Classification Search ............... 56/98, 56/94, 14.3, 93, 78, 106, 66, 60, 108, 111, 56/59, 500, 503, 88, 69, 82, 75
See application file for complete search history.

(56) References Cited

U.S. PATENT DOCUMENTS

| | | | | |
|---|---|---|---|---|
| 1,727,021 A * | 9/1929 | Van Nortwick | ............... | 56/104 |
| 1,896,711 A * | 2/1933 | Lichtenberg | ................. | 37/465 |
| 1,922,374 A * | 8/1933 | Krause | ........................ | 56/13.3 |
| 2,762,494 A * | 9/1956 | Aasland | ....................... | 198/733 |
| 3,520,121 A * | 7/1970 | Ashton et al. | .................. | 56/106 |
| 3,807,152 A * | 4/1974 | Storm et al. | ..................... | 56/98 |
| 4,266,394 A | 5/1981 | VanGinhoven et al. | ......... | 56/94 |
| 4,607,703 A | 8/1986 | Wang | .............................. | 171/1 |
| 4,771,592 A * | 9/1988 | Krone et al. | ................... | 56/14.3 |
| 5,826,415 A | 10/1998 | Becker | ............................. | 56/66 |
| 5,878,560 A | 3/1999 | Johnson | .......................... | 56/66 |
| 5,878,561 A | 3/1999 | Gunn | .............................. | 56/98 |
| 5,881,541 A | 3/1999 | Silver et al. | ...................... | 56/98 |
| 5,924,269 A * | 7/1999 | McMillen | ........................ | 56/66 |
| 6,226,969 B1 * | 5/2001 | Becker | ............................. | 56/62 |
| 6,230,476 B1 | 5/2001 | Carr et al. | ...................... | 56/14.3 |
| 6,237,312 B1 * | 5/2001 | Becker | ............................. | 56/62 |
| 6,237,314 B1 * | 5/2001 | Boll | .............................. | 56/500 |
| 6,516,599 B1 | 2/2003 | Clarke | ............................. | 56/98 |
| 6,925,790 B1 * | 8/2005 | Krone et al. | .................... | 56/51 |
| 2005/0120695 A1 * | 6/2005 | Calmer | ........................... | 56/51 |

* cited by examiner

*Primary Examiner*—Árpád Fábián-Kovács
(74) *Attorney, Agent, or Firm*—Michael G. Harms; John William Stader; Patrick M. Sheldrake

(57) ABSTRACT

A gathering conveyor for a row unit of an agricultural harvesting machine, including an elongate flexible conveyor element configured for encircling spaced apart first and second rotatable elements, for rotation thereabout so as to move along a stalkway of a row unit adapted for receiving a stalk of a plant to be harvested by the row unit, the conveyor element including gathering elements for conveying harvested crops along the stalkway, including elements that project into the stalkway and elements that project in the opposite direction, each of the gathering elements having a stepped profile shape when viewed from a longitudinal direction wherein either the upper or lower terminal end portions thereof are shorter, so that the gathering elements of conveyors of adjacent row units having oppositely shortened end portions can overlap, to enable positioning of the row units in closer proximity.

19 Claims, 4 Drawing Sheets

CROP GATHERING CONVEYOR WITH OVERLAPPABLE GATHERING ELEMENTS FOR A HEADER OF AN AGRICULTURAL HARVESTING MACHINE

TECHNICAL FIELD

This invention relates to a crop gathering conveyor of a header and an agricultural harvester such as a combine, and more particularly, to a crop gathering conveyor for a header for harvesting corn or maize, which conveyor includes gathering elements configured to overlap with gathering elements of an adjacent gathering conveyor, to allow operation of the conveyors in closely spaced relation.

BACKGROUND ART

Corn or maize headers for harvesting machines comprise row units, each of which typically includes two gathering conveyors, two snapping rolls and a pair of associated stripper plates. The gathering conveyors extend along opposite sides of a stalkway, which is a fore and aft extending slot that is open on the front end. The snapping rolls also extend along the opposite sides of the stalkway, typically below the gathering conveyors, as do the stripper plates. The gathering conveyors typically comprise endless chains each of which encircles a drive sprocket adjacent to the aft end of the stalkway, and a front sprocket adjacent to the forward end. The chain includes sidewardly projecting gathering elements, which are also sometimes referred to as gatherers or lugs.

In operation, during forward movement of the harvester over a field, each row unit will be aligned with and driven along a row of corn. The corn stalks will be received through the front open end into the stalkway, and the snapping rolls rotate to pull the corn stalk downward and past the stripper plates. As the stalk is pulled downward, the ears of corn which are attached to the stalk are stripped from the stalk by the stripper plates. The stripped ears are then conveyed rearwardly to an auger of the header by the gathering conveyors. This operation is performed simultaneously by each of the row units.

The adjacent row units of a corn header are spaced apart at spacings corresponding to the spacings between the adjacent rows of corn, such that the stalk ways can be aligned with the individual rows. Because of the width of the apparatus on each side of the stalk way of a row unit, there is typically a minimum row spacing of twice this width, that is, a spacing that accommodates the apparatus on adjacent sides of two side by side row units. Mainly, this width is a function of the width of the gathering conveyor.

Numerous attempts to reduce the width of the gathering conveyors, have been made. Reference in this regard, Becker U.S. Pat. No. 5,826,415, entitled Corn Gathering and Conveying System, issued Oct. 27, 1998; and Johnson U.S. Pat. No. 5,878,560, entitled Narrow Row Corn Head With Tilted Gatherers, issued Mar. 9, 1999, both of which involve tilting of the gathering conveyors. Reference also, Gunn U.S. Pat. No. 5,878,561, entitled Row Crop Harvester, also issued Mar. 9, 1999; and Clarke U.S. Pat. No. 6,516,599, entitled Corn Harvester With Improved Ear Picking Mechanism, issued Feb. 11, 2003, both of which involve staggering adjacent conveyors vertically.

A shortcoming of tilting the gathering conveyors is that the adjacent conveyors must still be spaced apart sufficiently such that the gathering elements or lugs of the two conveyors do not contact. Stacking adjacent conveyors allows the gathering elements and even the conveyors themselves to overlap. However, this can be a shortcoming as it requires the adjacent conveyors to be mounted at different heights. And, as a result, the conveyors on the opposite sides of the respective stalk ways will be at different heights, which can cause conveying problems.

What is sought therefore, is a gathering conveyor construction that can be incorporated into a row unit, which allows further reducing the spacing between adjacent row units, but which overcomes at least one of the shortcomings and limitations of the known constructions.

SUMMARY OF THE INVENTION

What is disclosed is a gathering conveyor for a row unit of an agricultural harvesting machine, that can be incorporated into a row unit, which allows further reducing the spacing between adjacent row units, and overcomes at least one of the shortcomings and limitations of the known constructions.

According to a preferred aspect of the invention, the gathering conveyor includes an elongate flexible conveyor element configured for encircling first and second rotatable elements supported in spaced relation along a stalkway of a row unit, such that when the rotatable elements are rotated, the conveyor element will move longitudinally along the stalkway. The conveyor element includes gathering elements at longitudinally spaced locations therealong, which project into the stalkway for conveying harvested crops along the stalkway during the movement of the conveyor element therealong. The conveyor element also includes gathering elements that project in the opposite direction, each of the gathering elements having a stepped profile shape when viewed from a longitudinal direction wherein either the upper or lower terminal end portions thereof are shorter, so that the gathering elements of conveyors of adjacent row units having oppositely shortened terminal end portions can overlap with the conveyor elements being at least generally coplanar, to enable positioning of the row units in closer proximity beside one another.

Accordingly, closer row spacing can be achieved with coplanar conveyors, without requiring tilting of the conveyor elements, or positioning of the conveyor elements in staggered or stacked relation, as in the known constructions. As another feature, the adjacent conveyor elements on opposite sides of the stalkway, and of side by side row units, can be of the same configuration, but with one inverted or upside down, to provide the overlapping capability. The overlapping capability also reduces or eliminates any requirement that adjacent conveyors be timed to alternate the positions of the respective gathering elements thereof, as they can pass over one another without contacting. Thus, the gathering elements of the adjacent conveyors can be directly or nearly opposing, with the conveyors in coplanar relation.

DETAILED DESCRIPTION OF THE INVENTION

Figure 1:
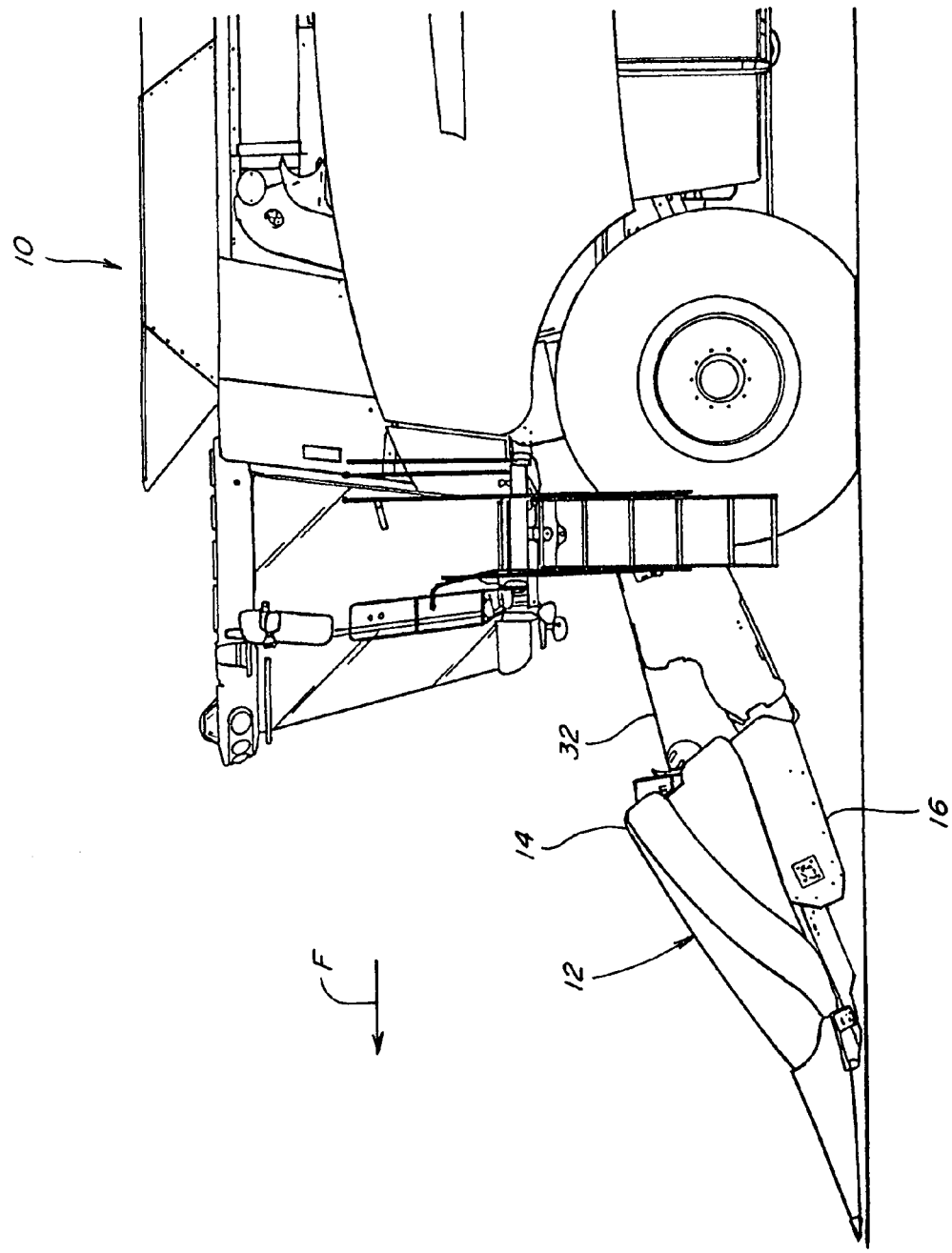
FIG. 1 is a fragmentary side view of the front end of an agricultural harvesting machine, including a header having row units including gathering conveyors of the invention.

Referring now to the drawings wherein a preferred embodiment of the present invention is shown, in FIG. 1 an agricultural harvesting-machine 10, which is a conventional combine, is illustrated including a header 12. Header 12 is of the variety commonly utilized for harvesting corn or maize planted in rows spaced a predetermined distance apart.

Figure 2:
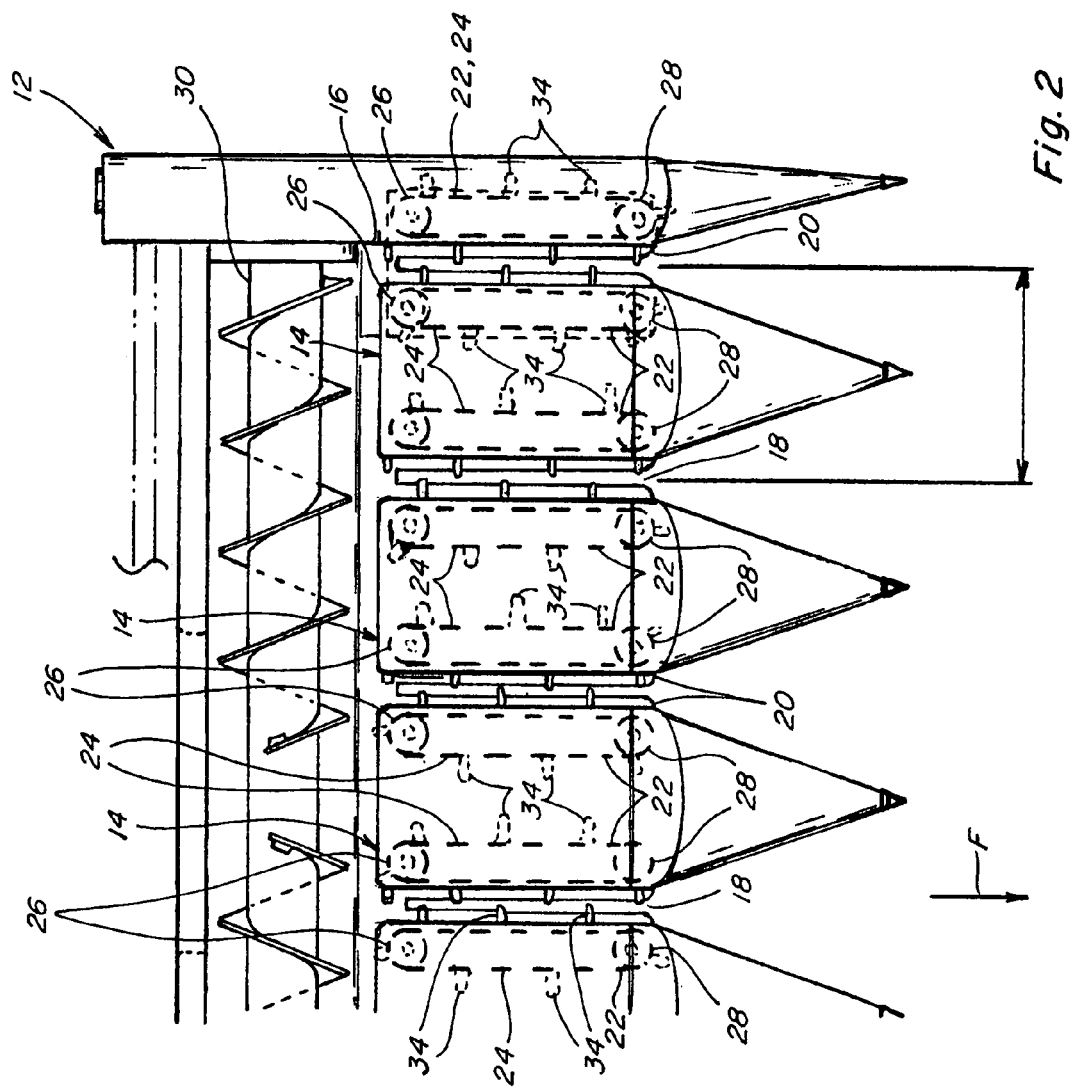
FIG. 2 is fragmentary top view of the header of FIG. 1, showing several of the row units including gathering conveyors of the invention.

Referring also to FIG. 2, header 12 includes a plurality of row units 14 supported on a frame 16 in predetermined, spaced apart, side-by-side relation, each row unit 14 defining a stalkway 18. Essentially, each stalkway 18 comprises a forwardly open slot into which the stalks of an individual row of corn plants are successively received, as combine 10 is moved forwardly, as denoted by arrow F, through a cornfield in alignment with the rows of plants, as is well known in the art. Each row unit 14 includes stripper plates 20 extending along and bounding the opposite sides of the respective stalkway 18 of the row unit, as shown, and snapping rolls (not shown) below stripper plates 20. Each row unit 14 additionally includes gathering conveyors 22 constructed and operable according to the teachings of the present invention, disposed along the respective opposite sides of stalkway 18.

Figure 4:
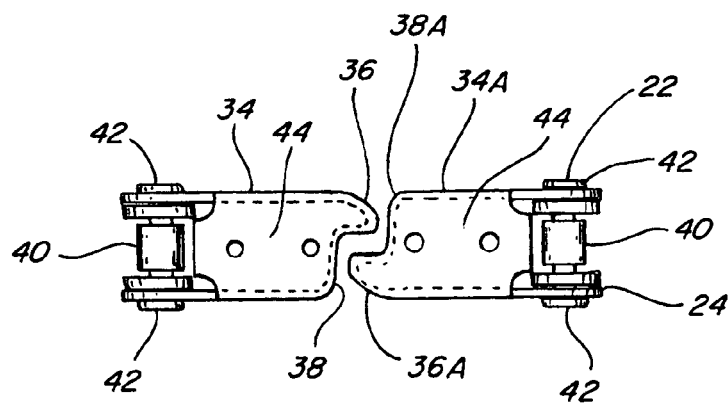
FIG. 4 is a longitudinal view of the gathering conveyors of FIG. 3.
Figure 3:
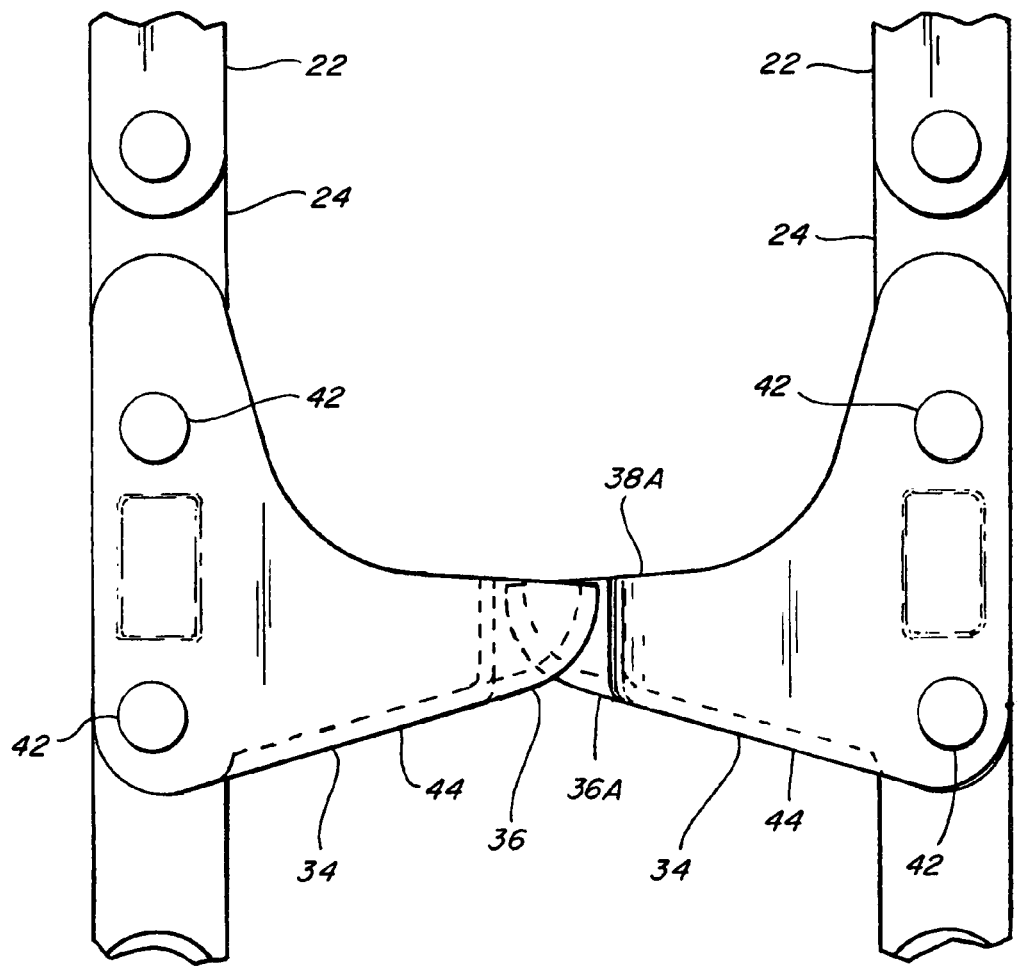
FIG. 3 is an enlarged fragmentary top view of a pair of gathering conveyors of the invention, illustrating an overlapping capability of gathering elements thereof.

Referring also to FIGS. 3 and 4, each gathering conveyor 22 preferably comprises an elongate flexible conveyor element 24 encircling spaced apart first and second rotatable elements 26 and 28, located, respectively, adjacent to the rear and front ends of stalkway 18, in the well-known manner. Conveyor elements 24 preferably comprise chains, and more preferably, roller chains, and one of rotatable elements 26 or 28 encircled thereby is rotatably driven, for instance, via a PTO of combine 10, or by a fluid motor or the like, and comprises, for instance, a sprocket, enmeshed with the chain. The other of rotatable elements 26 or 28 can also comprise a sprocket, or a roller or the like, and is freely rotatable.

In operation, rotation of the driven rotatable element 26 or 28 will move the conveyor element 24 about the rotatable elements and longitudinally along the adjacent stalkway, as is also well known. The normal direction of movement is rearwardly. As header 12 is moved along a swath of rows of corn plants, and conveyor elements 24 beside the respective stalkways 18 are moving in the rearward direction, the stalks of the plants will be successively received in the stalkways 18. At the same time, the snapping rolls beside the stalkways are rotated in a downward direction, such that the stalks will be pulled downwardly thereby. At the same time, the ears of corn will be brought into contact with the stripper plates 20, so as to be stripped or removed from the stalks. The loose ears will then be conveyed rearwardly along the stalkways by gathering conveyors 22, to an auger 30 which is rotatable for conveying the ears sidewardly toward the center of header 12. From there, the crops are received into the inlet of a feeder 32 of combine 10 (FIG. 1), for conveying to threshing apparatus of the combine for threshing thereby, all in the well known manner.

Each conveyor element 24 of the gathering conveyors 22 includes a plurality of gathering elements 34 projecting therefrom at longitudinally spaced locations therealong for projecting into the stalkway 18 beside the conveyor element; for conveying the harvested corn ears rearwardly along the stalkway as the conveyor is operated to move conveyor element 24 in that direction along the stalkway.

Each gathering element 34 preferably has a stepped profile shape when viewed from a longitudinal direction, that is, from the ends of the stalkway or in the fore and aft direction, as best shown in FIG. 4. Also referring to FIG. 3, this enables outer end portions of gathering elements 34 of adjacent conveyors 22 to overlap. More particularly, each gathering element 34 of conveyor element 24 of a first of the adjacent conveyors 22 includes an upper terminal end portion 36 which projects a greater distance sidewardly than a lower terminal end portion 38 thereof, and each gathering element, denoted by number 34A, of the second of the conveyors includes a lower terminal end portion, denoted by number 36A, which projects a greater distance toward the adjacent conveyor 22 than a lower terminal end portion 38A thereof. The stepped shapes are complimentary, that is, they are preferably the same, yet are inverted. As a result, the endmost terminal end portions 36 of the gathering elements 34 of the first of adjacent conveyors 22 can overlap the terminal end portions 36A of the second of the conveyors, thereby enabling the conveyors 22 to be at least generally coplanar, and the adjacent row units that they form a part of, to be positioned in closer side-by-side or laterally spaced relation, as best shown in FIG. 4.

Figure 6:
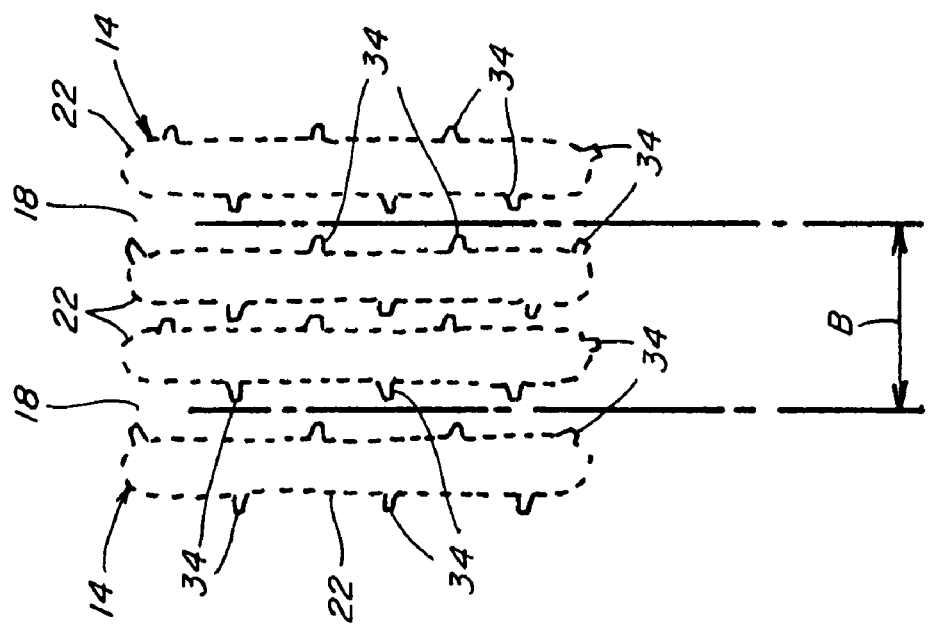
FIG. 6 is another schematic top view of the gathering conveyors of FIG. 5, illustrating another lateral spacing.
Figure 5:
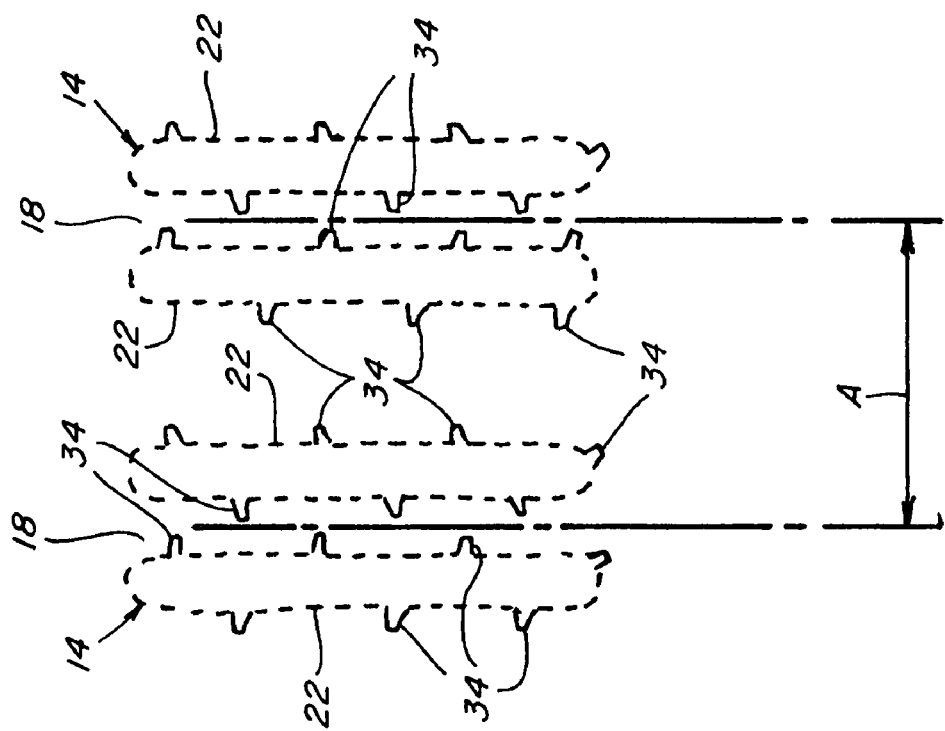
FIG. 5 is a schematic top view of gathering conveyors of two adjacent row units, illustrating one lateral spacing therebetween.

Referring also to FIGS. 5 and 6, in FIG. 5, two adjacent row units 14 are illustrated spaced apart such that the longitudinal centers of stalkways 18 thereof are a first predetermined lateral distance, denoted by distance A, apart, which can represent, for instance, a standard 30 inch (76 centimeters) row spacing as used commonly in the United States. Here, gathering elements 34 of the respective conveyors 22 are spaced well apart such that there is no risk of contact therebetween. In contrast, in FIG. 6, the two adjacent row units 14 are illustrated spaced apart such that the longitudinal centers of stalkways 18 thereof are a second predetermined lateral distance, denoted by distance B apart, which can represent, for instance, a 45 centimeter row spacing. Here, gathering elements 34 of the respective conveyors 22 are spaced much closer together, such that the terminal end portions of the gathering elements overlap in the above explained manner, while being at least generally coplanar. Although not illustrated, this also enables the gathering elements of the adjacent conveyors to be in directly or nearly opposing relation, if desired, and it is not necessary to longitudinally offset them.

Here also, it should be noted that chain of each conveyor element 24 comprises a roller chain, and gathering elements 34 are mounted in connection with rollers 40 (FIG. 4) of the roller chain, respectively, via pins 42 of the chain, to provide strength and rigidity. Additionally, each gathering element 34 has a surface 44 positioned to face in the longitudinal direction, the stepped profile shape being formed in surface 44. And, surface 44 is raked back in the longitudinal direction, to facilitate smooth conveying of the ears of corn. However, it should be recognized and understood that a wide variety of other constructions could be used as desirable for a particular application.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

What is claimed is:

1. A gathering conveyor for a row unit of an agricultural harvesting machine, comprising:

an elongate flexible conveyor element configured for encircling spaced apart first and second rotatable elements, for rotation thereabout for moving longitudinally along a stalkway of a row unit adapted for receiving a stalk of a plant to be harvested by the row unit, the conveyor element including a plurality of gathering elements projecting therefrom at longitudinally spaced locations therealong for projecting into a stalkway beside the conveyor element for conveying harvested crops therealong, wherein the gathering elements have a surface positioned to face in the longitudinal direction, a stepped profile shape being formed in the surface, wherein the stepped shape is formed by a notch in the surface, further wherein the notch is formed at a distal end of the gathering element thereof.

2. The gathering conveyor of claim 1, wherein the conveyor element comprises a chain.

3. The gathering conveyor of claim 2, wherein the chain comprises a roller chain and the gathering elements are mounted in connection with rollers of the roller chain, respectively.

4. The gathering conveyor of claim 3, wherein each of the gathering elements has a surface positioned to face in the longitudinal direction, the stepped profile shape being formed in the surface.

5. The gathering conveyor of claim 4, wherein the surface is raked back in the longitudinal direction.

6. The gathering conveyor of claim 4, wherein the surface is integrally formed with spaced apart link plates of a link of the chain.

7. The gathering conveyor of claim 4, wherein the notch is adjacent to an upper or a lower edge of the surface.

8. A row unit for an agricultural harvesting machine, comprising:
a frame;
an endless, elongate flexible first conveyor element encircling first and second rotatable elements supported by the frame for rotation in spaced relation along a first side of a stalkway adapted for receiving a stalk of a plant to be harvested by the row unit, the first conveyor element including a plurality of gathering elements projecting sidewardly therefrom into the stalkway at longitudinally spaced locations therealong, each of the gathering elements having a stepped profile shape when viewed from a longitudinal direction wherein an upper terminal end portion of the gathering element projects a greater distance into the stalkway than a lower terminal end portion thereof; and
an endless, elongate flexible second conveyor element encircling third and fourth rotatable elements supported by the frame for rotation in spaced relation along a second side of the stalkway opposite the first side and in at least generally coplanar relation with the first conveyor element, the second conveyor element including a plurality of gathering elements projecting sidewardly therefrom into the stalkway at longitudinally spaced locations therealong, each of the gathering elements of the second conveyor element having a stepped profile shape when viewed from a longitudinal direction wherein a lower terminal end portion thereof projects a greater distance into the stalkway than an upper terminal end portion thereof, and such that the lower terminal end portions of the gathering elements of the second conveyor element are lower than the upper terminal end portions of the gathering elements of the first conveyor element.

9. The row unit of claim 8, wherein the conveyor elements each comprise a chain.

10. The row unit of claim 9, wherein the chain comprises a roller chain and the gathering elements projecting sidewardly therefrom are mounted in connection with rollers of the roller chain, respectively.

11. The row unit of claim 10, wherein each of the gathering elements has a surface which faces and is raked back in the longitudinal direction.

12. The row unit of claim 11, wherein the surface is integrally formed with spaced apart link plates of a link of the chain.

13. The row unit of claim 9, wherein the surface has a stepped shape which forms the upper and the lower terminal end portions of the gathering element.

14. The row unit of claim 8, wherein the first conveyor element further comprises a plurality of the gathering elements extending therefrom in a sideward direction away from the stalkway, and wherein the row unit is supported beside a second row unit supported by the frame and including an endless, elongate flexible third conveyor element encircling fifth and sixth rotatable elements supported by the frame for rotation in spaced relation along a side of a second stalkway and in at least generally coplanar relation with the second conveyor element, the third conveyor element including a plurality of gathering elements projecting sidewardly therefrom into the second stalkway at longitudinally spaced locations therealong, and the third conveyor element including a plurality of the gathering elements projecting therefrom in a sideward direction away from the second stalkway and toward the second conveyor element, each of the gathering elements of the third conveyor element having a stepped profile shape when viewed from a longitudinal direction wherein an upper terminal end portion of the gathering element projects a greater distance sidewardly than a lower terminal end portion thereof, such that the row units can be positioned sufficiently close together such that the upper terminal end portions of the gathering elements of the third conveyor element can overlap the lower terminal end portions of the gathering elements of the second conveyor element.

15. The row unit of claim 14, wherein the row units are positioned sufficiently close together such that when at least one of the second and third conveyor elements is moved the upper terminal end portions of the gathering elements of the third conveyor element will overlap the lower terminal end portions of the gathering elements of the second conveyor element.

16. A header for an agricultural harvesting machine, comprising:
a frame;
a first row unit including an endless, elongate flexible first conveyor element encircling spaced apart first and second rotatable elements supported by the frame for rotation thereabout for moving along a first side of a stalkway adapted for receiving a stalk of a plant to be harvested by the row unit, the first conveyor element including a plurality of gathering elements projecting sidewardly therefrom into the stalkway at longitudinally spaced locations therealong and a plurality of the gathering elements extending therefrom in a sideward direction away from the stalkway, each of the gathering elements having a stepped profile shape when viewed from a longitudinal direction wherein an upper terminal end portion of the gathering element projects a greater distance into the stalkway than a lower terminal end portion thereof, the first row unit including an endless, elongate flexible second conveyor element encircling spaced apart third and fourth rotatable elements supported by the frame for moving along a second side of the stalkway opposite the first side, the second conveyor element being in at least generally coplanar relation with the first conveyor element, the second conveyor element including a plurality of gathering elements projecting sidewardly therefrom into the stalkway at longitudinally spaced locations therealong in at least generally coplanar relation to the gathering elements, each of the gathering elements of the second conveyor element having a stepped profile shape when viewed from a longitudinal direction wherein a lower terminal end portion thereof projects a greater distance into the stalkway than an upper terminal end portion thereof, and such that the lower terminal end portions of the gathering elements of the second conveyor element are lower than the upper terminal end portions of the gathering elements of the first conveyor element; and a second row unit supported by the frame beside the first row unit and including an endless, elongate flexible third conveyor element encircling fifth and sixth rotatable elements supported by the frame for rotation thereabout for moving along a side of a second stalkway and in at least generally coplanar relation with the second conveyor element of the first row unit, the third conveyor element including a plurality of gathering elements projecting sidewardly therefrom into the second stalkway at longitudinally spaced locations therealong, and the third conveyor element including a plurality of the gathering elements projecting therefrom in a sideward direction away from the second stalkway and toward the second conveyor element, each of the gathering elements of the third conveyor element having a stepped profile shape when viewed from a longitudinal direction wherein an upper terminal end portion of the gathering element projects a greater distance sidewardly than a lower terminal end portion thereof, the row units being positioned sufficiently close together such that the upper terminal end portions of the gathering elements of the third conveyor element can overlap and pass over the lower terminal end portions of the gathering elements of the second conveyor element.

17. The header of claim 16, wherein the conveyor elements each comprise a chain.

18. The header of claim 17, wherein the chain comprises a roller chain and the gathering elements projecting sidewardly therefrom are mounted in connection with rollers of the roller chain, respectively.

19. A row unit for an agricultural harvesting machine, comprising:

a frame;

an endless, elongate flexible first conveyor element encircling first and second rotatable elements supported by the frame for rotation in spaced relation along a first side of a stalkway adapted for receiving a stalk of a plant to be harvested by the row unit, the first conveyor element including a plurality of gathering elements projecting sidewardly therefrom into the stalkway at longitudinally spaced locations therealong, each of the gathering elements having a first stepped profile shape when viewed from a longitudinal direction; and an endless, elongate flexible second conveyor element encircling third and fourth rotatable elements supported by the frame for rotation in spaced relation along a second side of the stalkway opposite the first side and in at least generally coplanar relation with the first conveyor element, the second conveyor element including a plurality of gathering elements projecting sidewardly therefrom into the stalkway at longitudinally spaced locations therealong, each of the gathering elements of the second conveyor element having a second stepped profile shape when viewed from a longitudinal direction, wherein the second stepped profile is an inverted stepped profile from the first stepped profile such that the first and second stepped profiles are shaped complimentary to one another.

\* \* \* \* \*